United States Patent
Falkenberg et al.

(10) Patent No.: US 12,081,413 B2
(45) Date of Patent: *Sep. 3, 2024

(54) LINK CLOUDS AND USER/COMMUNITY-DRIVEN DYNAMIC INTERLINKING OF RESOURCES

(71) Applicant: International Business Machines Corporation, Armonk, NY (US)

(72) Inventors: Matthias Falkenberg, Stuttgart (DE); Hendrik Haddorp, Holzgerlingen (DE); Stephan Laertz, Herrenberg (DE); Andreas Nauerz, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1477 days.

This patent is subject to a terminal disclaimer.

(21) Appl. No.: 15/796,855

(22) Filed: Oct. 30, 2017

(65) Prior Publication Data
US 2018/0069766 A1 Mar. 8, 2018

Related U.S. Application Data

(63) Continuation of application No. 14/097,620, filed on Dec. 5, 2013, now Pat. No. 9,806,957, which is a (Continued)

(30) Foreign Application Priority Data

Sep. 18, 2009 (EP) ..................... 09170680

(51) Int. Cl.
*G06F 3/048* (2013.01)
*G06Q 10/10* (2023.01)
(Continued)

(52) U.S. Cl.
CPC ............. *H04L 41/22* (2013.01); *G06Q 10/10* (2013.01); *G06Q 30/02* (2013.01)

(58) Field of Classification Search
CPC .. G06F 19/322; G06F 17/3089; G06F 16/951; G06F 16/958; G06F 16/9535;
(Continued)

(56) References Cited

U.S. PATENT DOCUMENTS 5,940,803 A * 8/1999 Kanemitsu ............. G06Q 10/02
705/5
6,377,932 B1 4/2002 Demarcken
(Continued)

FOREIGN PATENT DOCUMENTS

KR 2011003108 A 3/2011

OTHER PUBLICATIONS

Nauerz, A., et al., "New Tagging Paradigms for Content Recommendation in Web 2.0 Portals," Workshop on Adaptation and Personalization for Web 2.0, UMAP '09, Jun. 22-26, 2009.
(Continued)

*Primary Examiner* — Linh K Pham
(74) *Attorney, Agent, or Firm* — CUENOT, FORSYTHE & KIM, LLC

(57) ABSTRACT

A network-based communication and information discovery solution that pertains to network-accessible resources and the use of interlinks among resources. In one embodiment, dynamic interlinking of resources is proposed, wherein the resources reside in a web-based system and are accessible via web-clients. The resources can be representable by an administrator in a graph-like structure interlinking the resources with each other and thus defining a navigation model. An extended navigation model can be implemented by a user-generated, individual or collaborative interlinking functionality.

20 Claims, 7 Drawing Sheets

INVENTIONAL

Related U.S. Application Data continuation of application No. 12/877,629, filed on Sep. 8, 2010, now Pat. No. 8,683,344.

(51) Int. Cl.
*G06Q 30/02* (2023.01)
*H04L 41/22* (2022.01)

(58) Field of Classification Search
CPC ..... G06F 16/954; G06F 16/972; G06Q 30/02; G06Q 30/0601; G06Q 40/12; G06Q 10/025
See application file for complete search history.

(56) References Cited

U.S. PATENT DOCUMENTS

| | | | |
|---|---|---|---|
| 6,606,653 B1* | 8/2003 | Ackermann, Jr. | |
| | | | H04L 29/12009 |
| | | | 709/203 |
| 6,609,098 B1 | 8/2003 | Demarcken | |
| 6,828,992 B1 | 12/2004 | Freeman et al. | |
| 7,082,400 B2 | 7/2006 | Jones et al. | |
| 7,111,232 B1 | 9/2006 | Bascom | |
| 7,181,410 B1 | 2/2007 | Jones et al. | |
| 7,260,774 B2* | 8/2007 | Lambert | G06Q 30/02 |
| | | | 707/E17.119 |
| 7,660,815 B1* | 2/2010 | Scofield | G06F 16/951 |
| | | | 707/999.102 |
| 7,730,429 B2 | 6/2010 | Kruse et al. | |
| 7,813,965 B1* | 10/2010 | Robinson | G06Q 30/02 |
| | | | 705/26.1 |
| 8,683,344 B2 | 3/2014 | Falkenberg et al. | |
| 9,806,957 B2 | 10/2017 | Falkenberg et al. | |
| 2001/0032253 A1 | 10/2001 | Duxbury et al. | |
| 2002/0073093 A1 | 6/2002 | Aoyama et al. | |
| 2003/0041108 A1 | 2/2003 | Henrick et al. | |
| 2003/0190960 A1 | 10/2003 | Jokipii et al. | |
| 2004/0068527 A1* | 4/2004 | Smith, III | G06F 16/748 |
| 2004/0117376 A1 | 6/2004 | Lavin et al. | |
| 2004/0181515 A1 | 9/2004 | Ullmann et al. | |
| 2005/0262005 A1* | 11/2005 | Woolston | G06F 16/954 |
| | | | 705/37 |
| 2006/0053384 A1 | 3/2006 | La Fetra et al. | |
| 2006/0064333 A1* | 3/2006 | Razza | G06Q 50/14 |
| | | | 705/5 |
| 2006/0106655 A1 | 5/2006 | Lettovsky et al. | |
| 2006/0106763 A1 | 5/2006 | Dirisala | |
| 2006/0287897 A1* | 12/2006 | Sobalvarro | G06Q 10/025 |
| | | | 705/5 |
| 2007/0011034 A1* | 1/2007 | Jones | G06Q 10/02 |
| | | | 705/6 |
| 2007/0016579 A1* | 1/2007 | Kaul | G06F 16/951 |
| 2007/0168239 A1 | 7/2007 | Marcken et al. | |
| 2007/0233736 A1* | 10/2007 | Xiong | G06Q 30/02 |
| 2007/0239680 A1 | 10/2007 | Oztekin et al. | |
| 2008/0000964 A1* | 1/2008 | Flake | G06Q 30/00 |
| | | | 705/26.1 |
| 2008/0071929 A1* | 3/2008 | Motte | H04L 67/20 |
| | | | 709/246 |
| 2008/0077669 A1 | 3/2008 | Ozveren et al. | |
| 2008/0104225 A1 | 5/2008 | Zhang et al. | |
| 2008/0114756 A1 | 5/2008 | Konig et al. | |
| 2008/0177839 A1 | 7/2008 | Chang et al. | |
| 2008/0243564 A1 | 10/2008 | Busch et al. | |
| 2008/0306918 A1 | 12/2008 | Mons et al. | |
| 2009/0077124 A1* | 3/2009 | Spivack | G06F 16/25 |
| 2009/0083244 A1* | 3/2009 | Li | G06F 16/9535 |
| 2009/0119278 A1 | 5/2009 | Cross et al. | |
| 2009/0157630 A1* | 6/2009 | Yuan | G06F 16/951 |
| | | | 715/810 |
| 2009/0198506 A1 | 8/2009 | Gupta | |
| 2009/0249244 A1 | 10/2009 | Robinson et al. | |
| 2010/0088428 A1* | 4/2010 | Hendrickson | H03M 7/04 |
| | | | 709/242 |
| 2010/0094859 A1 | 4/2010 | Gupta | |
| 2010/0287183 A1 | 11/2010 | Kamireddy et al. | |
| 2011/0066982 A1 | 3/2011 | Paulsami et al. | |
| 2011/0138292 A1 | 6/2011 | Falkenbert et al. | |
| 2011/0225033 A1 | 9/2011 | Schmeyer et al. | |
| 2012/0198391 A1* | 8/2012 | Borriello | G06F 16/958 |
| | | | 715/854 |
| 2012/0278153 A1 | 11/2012 | Bamborough et al. | |
| 2014/0096023 A1 | 4/2014 | Falkenberg et al. | |

OTHER PUBLICATIONS

Kim, H.L. et al., "Review and alignment of tag ontologies for semantically-linked data in collaborative tagging spaces," In 2008 IEEE International Conference on Semantic Computing, pp. 315-322, IEEE, Aug. 2008.

Conklin, J., "Hypertext: An Introduction and Survey," In Computer, Vo. 20, No. 9, Sep. 1987, pp. 17-41, IEEE.

Shakya, A., et al., "Consolidating user-defined concepts with StYLiD," In Proc. of 2007 Int'l. Conf. on Posters and Demonstrations, vol. 401, pp. 139-140, Oct. 2008.

Stein, A., et al. "Collaborative Research and Documentation of European Film History: The COLLATE Collaboratory," In Journal of Digital Information Management, vol. 2, pp. 30-39, 2004.

U.S. Appl. No. 12/877,629, Non-Final Office Action, Apr. 19, 2013, 20 pg.

U.S. Appl. No. 12/877,629, Notice of Allowance, Nov. 4, 2013, 19 pg.

U.S. Appl. No. 14/097,620, Non-Final Office Action, Jul. 16, 2015, 25 pg.

U.S. Appl. No. 14/097,620, Final Office Action, Dec. 14, 2015, 32 pg.

U.S. Appl. No. 14/097,620, Non-Final Office Action, Apr. 20, 2016, 29 pg.

U.S. Appl. No. 14/097,620, Final Office Action, Nov. 3, 2016, 10 pg.

U.S. Appl. No. 14/097,620, Notice of Allowance, Jun. 20, 2017, 12 pg.

* cited by examiner

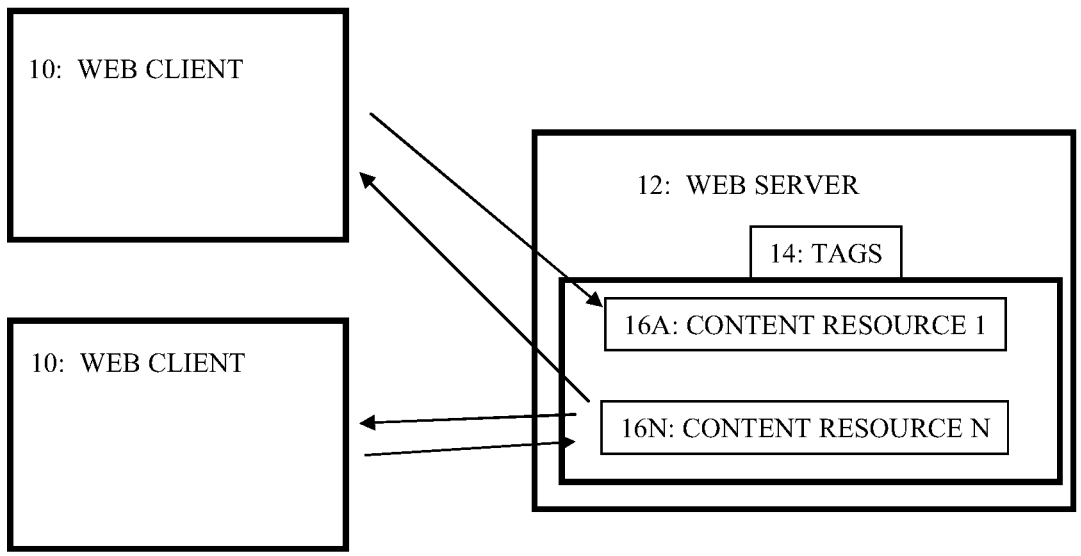
PRIOR ART  FIG. 1
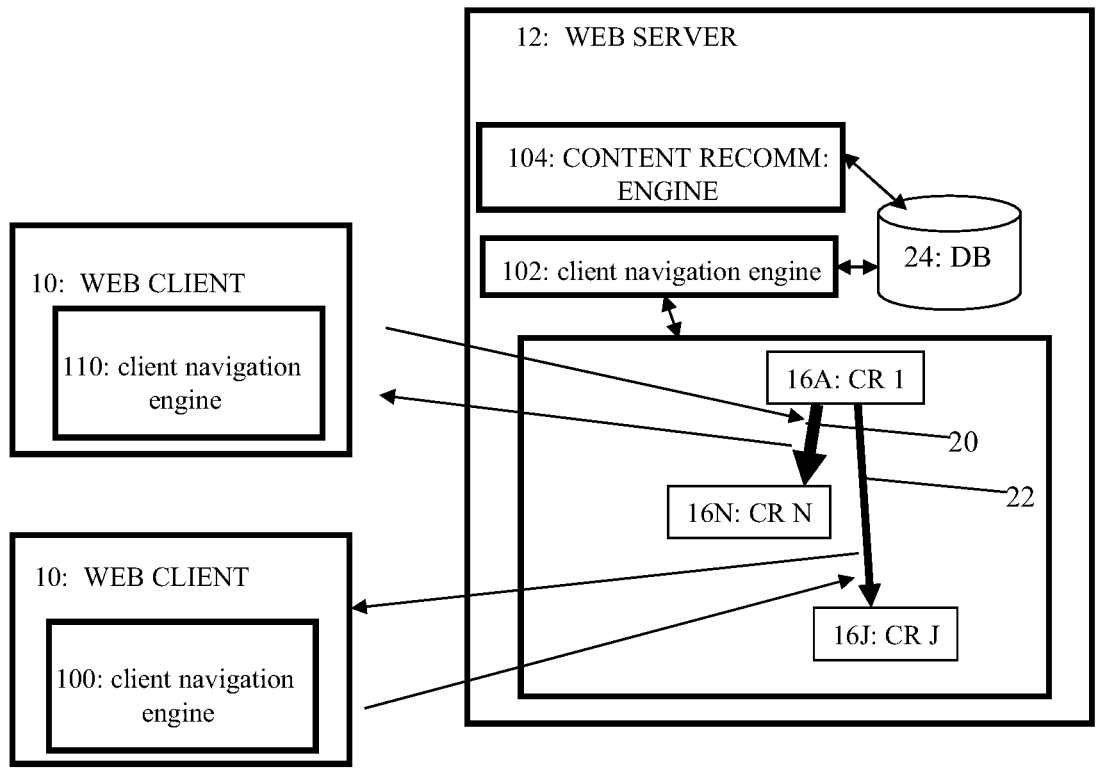
INVENTIONAL  FIG. 2

LINK CLOUDS AND USER/COMMUNITY-DRIVEN DYNAMIC INTERLINKING OF RESOURCES

CROSS-REFERENCE TO RELATED APPLICATIONS

This application claims the benefit of U.S. application Ser. No. 12/877,629 filed 8 Sep. 2010, which claims the benefit of European Patent Application No. 09170680.4 filed 18 Sep. 2009. The teachings of the parent case (application Ser. No. 12/877,629) and its European parent (Application No. 09170680.4) are hereby incorporated by reference in their entirety.

BACKGROUND

The disclosure relates to the field of network-based communication and information discovery and to network-based storage and management of network-accessible resources. More specifically, the disclosure relates to link clouds and user/community driven dynamic interlinking of resources.

In recent years, web-based systems such as Enterprise Information Portals have gained importance in many companies. Some of these systems integrate, as a single point of access, various applications and processes into one homogeneous user interface. Such systems can encompass a huge amount of content. Content of these systems are often not exclusively maintained by single, centralized entity. Instead Web 2.0 techniques may be used, allowing user generated content to be added. These systems can grow quickly and in a somewhat uncoordinated way as different users possess different knowledge and expertise and obey to different mental models. That is, the loosely coupled nature of Web 2.0 systems can be both a benefit for acquiring content and a hindrance for finding relevant content for a given user's needs.

In other words, the continuous growth of content systems where users are permitted to add content can makes it increasingly challenging to access relevant information, quickly. Hence, there is a disconnect between user needs and available tools. That is, users often need to find task and/or role-specific information quickly, yet these same users face information overload that can leaves them feeling lost in hyperspace. Consequently, users may not be able to locate resources that are potentially relevant to their tasks, simply because they never come across them.

The recent popularity of collaboration techniques on the Internet, particularly tagging and rating, provides new means for both semantically describing Web content and for indicating users' interests, preferences and contexts.

FIG. 1 shows basic structural components of a prior art hardware and software environment used for a prior art tagging-based method when searching for some content. In FIG. 1, a web client 10 (which may be one of large plurality of web clients) cooperates with a web server 12 during a user's search for content. Tags 14 are used for characterizing the content. There are many resources 16A . . . 16N available (accessible) by the searching user via a Web browser interface of Web client 10. Conventional tags 14 are often not selective enough for the needs of a searching user, which results in this user being able to find the best suited content only accidentally. That is, a user is generally unable to consistently find the best suited available content on a consistent basis when searching for a reasonable duration.

Problems can also result from different system users having different experience levels, when all of these users contribute tag content to a certain theme or topic. For example, a more expert user may know many details of a given theme, and will keep them unpublished (not tagged), because this user believes these details are self-evident. Other less expert users, however, who also contribute content to the Internet, may not know many basic or rudimentary details, which they will incorporate into the tag information. Such overly rudimentary details will not really be interesting for more advanced users, and may be distracting, thus making finding desired content in a reasonable duration challenging. Additionally, different users often use different terms, which may be synonyms to each other, or at least may be closely related in context of the content. Thus, different terms and different tags may exist, which are directed to the same content. Use of different, yet corresponding terms, for the same thing can make searching, tagging, and indexing difficult.

BRIEF SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

One aspect of the disclosure is for an electronic, web-based data processing system, a method, a computer program product, and/or an apparatus usable for dynamic interlinking of resources. This aspect can, but need not include: a mechanism allowing users dynamically interlinking of arbitrary resources, wherein said mechanism comprises a GUI component displayed for a resource a user is looking at; an extended navigation model extended by a user-generated, individual or collaborative interlinking; a navigation GUI including a graphical representation for the user-generated interlinks; an analyze component measuring the most frequently defined interlinks between two resources; a graphical component displayed for a current resource, comprising links to those resources the current resource is linked to, wherein each link is represented differently depending on said frequency; a component for generating individual and community navigation permanently displayed in the web-client, wherein said individual navigation includes individual interlinks only, and wherein community navigation includes collaboration interlinks, and a content recommendation component leveraging the knowledge about created interlinks to recommend related resources which will be displayed for each resource. In one embodiment, the resources can reside on said system and can be accessible via web-clients. The resources can be representable by an administrator in a graph-like structure interlinking the resources with each other and thus defining a navigation model.

BRIEF DESCRIPTION OF THE SEVERAL VIEWS OF THE DRAWINGS

FIG. 1 (Prior Art) illustrates structural components for finding content from a Web server.

FIG. 2 illustrates structural components of a Web server that utilizes interlinks in accordance with an embodiment of the disclosure.

DETAILED DESCRIPTION

Figure 3A:
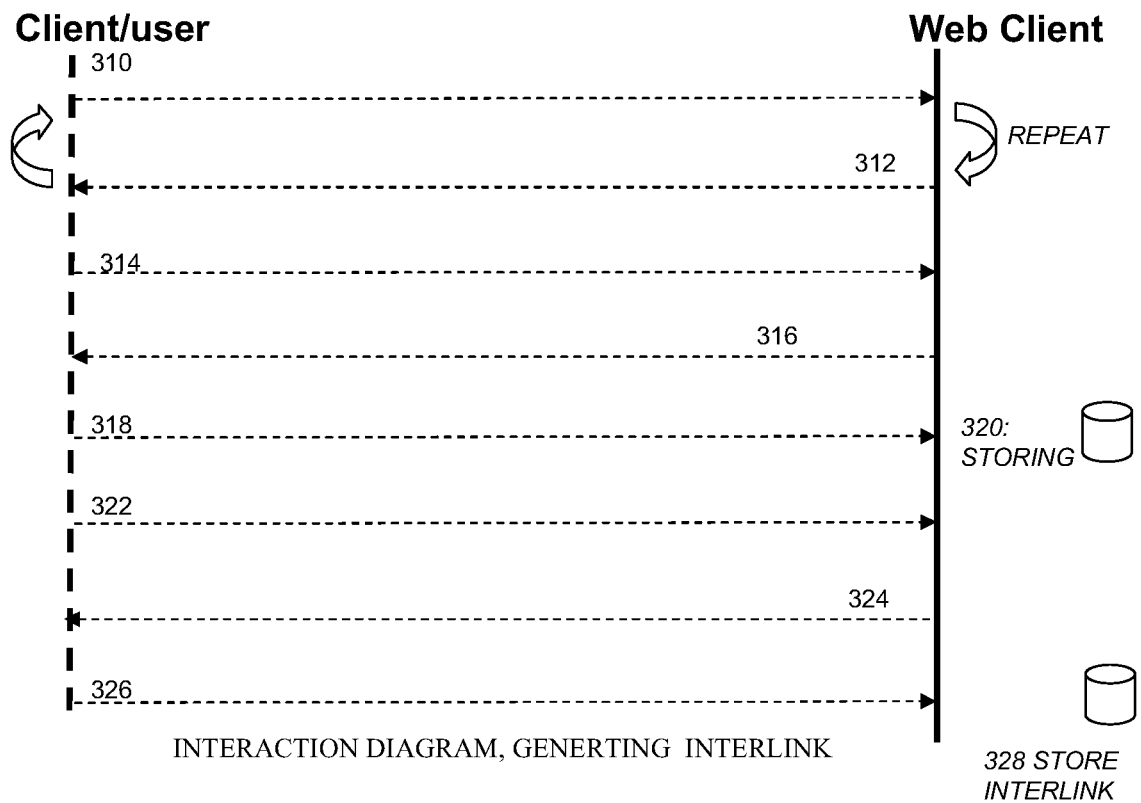
FIG. 3A illustrates the control flow for generating interlinks in accordance with an embodiment of the disclosure.

In the disclosure, dynamic interlinking of resources is proposed, wherein the resources reside in a web-based system and are accessible via web-clients. The resources can be representable by an administrator in a graph-like structure interlinking the resources with each other and thus defining a navigation model. An extended navigation model can be implemented by a user-generated, individual or collaborative interlinking functionality.

Interlinking features disclosed herein enable a user to navigate in a very efficient way, without losing time in searching the adequate navigation in a large plurality of web sites, in order to do any task, defined by its goal, e.g. to book a flight, a hotel and rent a car, together, as a single business activity. Further, this can be done without using tags. It thus avoids the disadvantages described above in the discussion of prior art.

The generated interlink connections can be restricted for individual use only, or can be made available for pre-defined user groups, or even for any user. So, experienced users can follow a shorter navigation path than novice users who need more comments and explanations in any given business activity. In one embodiment, certain content can be recommended without using tags. This avoids the disadvantages described above in the discussion of prior art.

In one embodiment that uses multi-segment linking, a whole link flow can be presented to the user. The step of skipping from one to the next resource can be done automatically or triggered by a user input (e.g. clicking a button) to automatically perform the "next link" comprised of the link sequence (i.e. the link flow).

Thus using the disclosure, a kind of interactive "web cinema" can be provided to the user in which a large plurality of users can easily experience that what other users have composited.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Before referring to the Figures, definitions of a few terms are provided. These terms apply to the discussion of FIG. 1, as well as the other figures in this Disclosure. As used herein, tagging refers to the process of assigning keywords (or metadata) to resources. A tag itself is "some" metadata associated to a resource. Tags themselves are non-hierarchical keywords taken from an uncontrolled vocabulary.

A resource can refer to an entity that is uniquely identifiable (addressable). Thus, a resource can be a Web resource having an associated Uniform Resource Locator (URL), a domain name, or some other unique identifier (which can be either locally or globally unique depending on usage). Tags can add valuable meta information and even lightweight semantics to web resources.

A rating refers to the evaluation or assessment of something, in terms of quality (as with a critic rating a novel), quantity (as with an athlete being rated by his or her statistics), or some combination of both. That is, it is the process of assigning (e.g. numeric) "values" to resources indicating how much people "like" those. A rating itself is "some value" associated to a resource. Ratings themselves are chosen from an interval of possible "values" whereas the one end of the interval usually refers to "dislike" and the other to "like".

Turning to FIG. 2, one or more web clients 10 cooperate with a web server 12 during his search for selected content. Unlike conventional teachings that are dependent upon tags (e.g. FIG. 1), an embodiment of the disclosure utilizes weighted links 18 for navigating and guiding the user through the content comprised of the many resources 16A . . . 16N.

A first usage scenario relates to navigation in a single, complex portal. In this scenario, the web server 12 stores the user navigation information (i.e., the sequences of accessed network resources over a longer historic time range). Then, offline and independent of actual user traffic, an evaluation component analyzes the navigation and determines those navigation data which were used most frequently by the users. In one example, the evaluation yields that most users of the example (e.g., 160,000 users in a month) selected a link to the content of resource 16N from 16A, which is denoted by arrow 20 illustrating the interlinking of resources 16A and 16N.

Further, starting again from current content 16A, less users (e.g., 80,000 users in a month) selected a link to the content 16J of resource J from resource 16A, which is denoted by arrow 22 illustrating the interlinking of resources 16A and 16J. Thus, a kind of linking statistic is done permanently at the web server. So, the Web server 12 is provided with an interlink-engine and database 24, which picks always for each resource accessed actually by any client 10 the actual respective interlink statistic and displays to the user those "favorite" links to a next resource. So, the user may follow directly such interlink proposal, and will in most cases finish his work much more early than before, as in most cases the large majority finds out the best way to perform a task in the Internet.

Another usage scenario provides for interlinking across different web servers. In this scenario a user is assumed to request a certain web page. This user request is intercepted by a proxy server which is pre-connected between client browser and said user desired web page. This proxy server extracts the URL of said web page from the user request and requests this page itself. The proxy server fetches the content of this requested web page. Then in a particular step associated with the disclosure, the proxy server will enrich the Markup Code or whatever code received from the user desired web page with own additional Markup code comprising the GUI specific for the invention as discussed further above. So, the proxy server will inject this additional code which provides for the linkage functionality described above, into the received code.

In a next step the proxy server forwards the enriched code back to the browser of the requesting user, for whom the operation of the proxy server is fully transparent. Then the user is displayed a GUI relating to link clouds, etc., as described above and is thus enabled to press a button for starting or finishing a linkage process, respectively. The database comprising and managing the link statistics may runs at said proxy server. The link collecting and evaluation engine, as denoted in FIG. 2 as content recommendation engine and navigation engine thus collects the user activities and thus operates across different web servers. Thus it is enabled also to display the interlinking GUI for accessing links between different web servers.

The skilled reader will understand that the before mentioned proxy server may also be interconnected between the user's Web Browser and more than one web server. So, the proxy server can also include an own "simple business voyage" portal comprising user access functionality according to the state-of-the-art and offering to the user a kind of "simplified" business voyage activities by using the before-described linking functionality for a predetermined pool of business offerers with a respective predetermined pool of business web servers. Such pool of web servers may comprise for example a number of twenty flight offerers, twenty rental car offerers, twenty hotel chains.

Figure 3B:
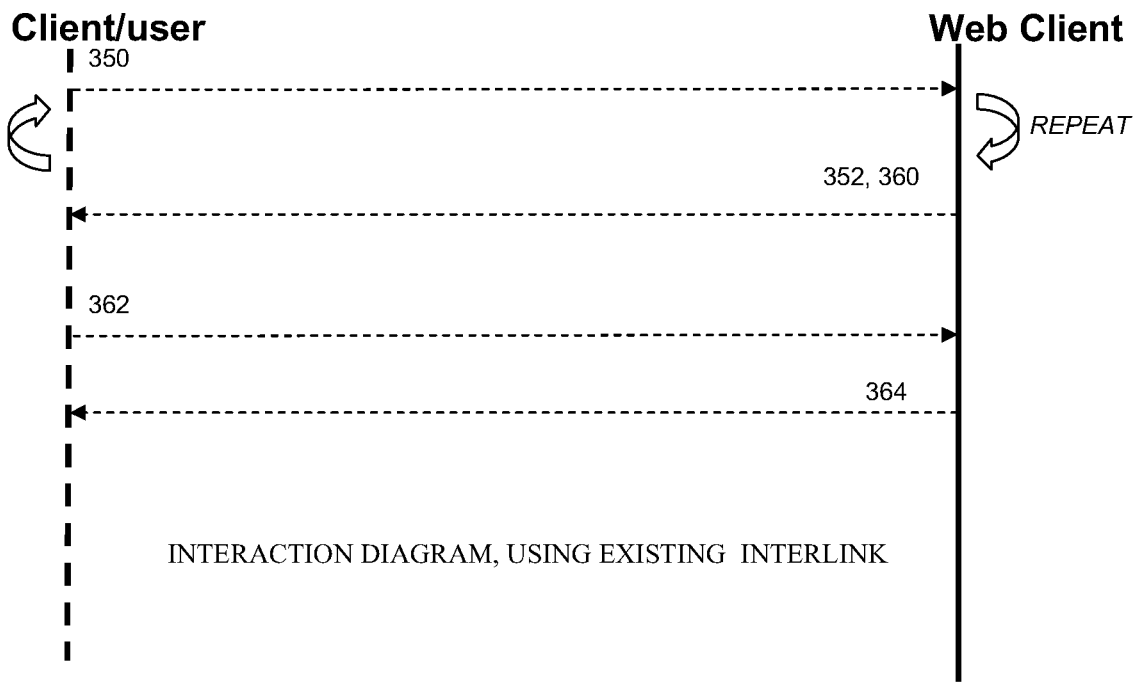
FIG. 3B illustrates the control flow for utilizing interlinks in accordance with an embodiment of the disclosure.

FIGS. 3A and 3B illustrate the control flow of the an embodiment of the disclosed method in a web client and in a web server, as well as their interaction.

With reference to FIG. 3A an interaction diagram is shown for illustrating the workflow between a user navigating through a portal system by means of his web browser (left side) and a web server client (right side) which serves the user request, in the context of generating interlinks according to the invention.

In first step 310 a user navigates through the portal system, visits one or another webpage which is served respectively by the client web server in a respective serving step 312 in response to each web request of a step 310. In the step or steps 312 a user request is responded by the web server by sending for example the mark up for a page being requested by a user.

Steps 310 and 312 might be repeated without any predetermined limitation.

Then, the user is assumed to navigate to a source page in the context of the present invention, this is a page the user wants to interlink from, see step 314. In response to that request the web server serves this request in a step 316 and sends the mark up for this source page. This source page can be assumed to comprise according to the invention a button "interlink from", see also FIG. 5, reference 50 and 54. The user decides to select this current web page (source page) as a source for an interlink generated by him. Thus, he clicks the button "interlink from", step 318. This clicking of this button triggers the storage of the ID of the source page at the side of the web server. He allocates storage space adequate and dimensioned such that a full complete data set as illustrated exemplarily in FIG. 12 may be stored in relation to the before mentioned ID of the source page.

Then, the user is assumed to continue navigating. For example the user can navigate through the portal system and finds after a sequence of navigation steps crossing over a number of twelve pages until he finds that what the user originally wants to find; namely the "target page" (i.e., the web page which corresponds to the source page as being associated to the source page by some business context). Once the user has realized that he has landed correctly on exactly the page which is useful to use in order to complete the desired business activity, he clicks a button "interlink to here", see also FIG. 5, reference 52. This button "interlink to here" is displayed to a user according to this embodiment in basically all those web pages which show some useful content for a user or, if provided at every web page in order to enable the user to feel free when generating targets for an interlink procedure. This happens in step 322 and 324.

Figure 12:
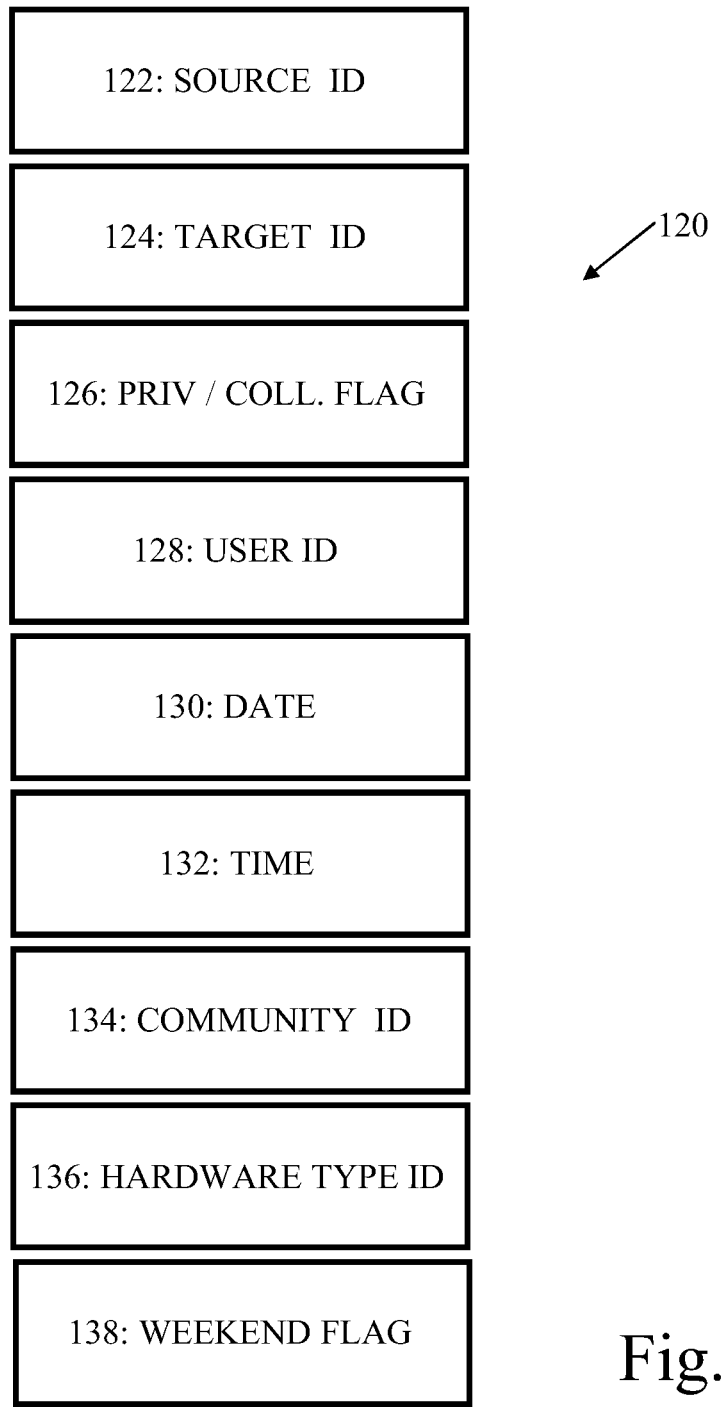
FIG. 12 illustrates a dataset usable for storing the information which is required or useful, respectively, in accordance with an embodiment of the disclosure.

Then, in a further step 326 the user is assumed to click the button "interlink to here". This click triggers the storing of the ID of the target page (i.e. the current page) where the user clicked the button "interlink to here" at the storage location related to the source page stored for the interlink at step 320. Then, further data are collected by the web server, as they reveal from FIG. 12. So, a data set according to FIG. 12 is stored at step 328. By that, the data set of step 328 can be provided to a further or to the same user when he visits the source page of this interlink in order to provide efficient navigation for quickly completing his business activity, when he or another user visits the source page in another web session. This is shown in more detail with reference to FIG. 3B, which illustrates an interaction diagram including the steps of the web server offering an interlink as described with reference to FIG. 3A.

With reference now to FIG. 3B, the user is assumed to have navigated through the portal system as described above to perform the business activity of FIG. 3 A. In a step 350, he requests a given web page, which request is served by the web server by sending its response, containing the mark up of the requested page, step 352.

Figure 8:
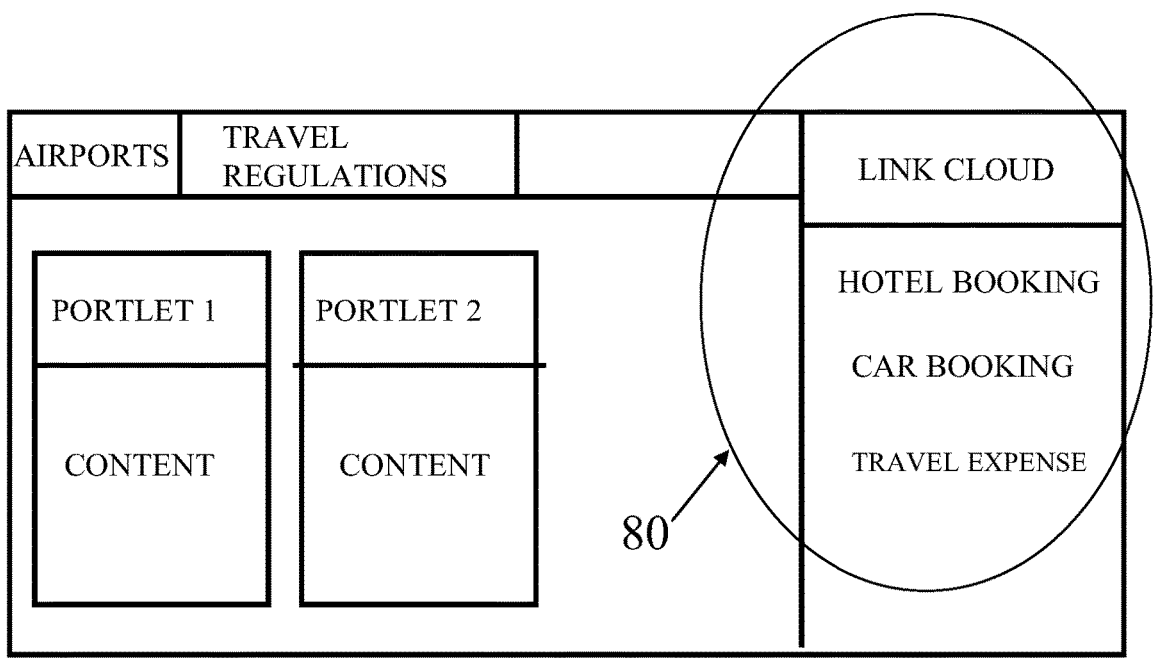
FIG. 8 illustrates use of Link Clouds in accordance with an embodiment of the disclosure.

It should be noted that during its navigation of step 350 or the navigation before the user reaches the web page of step 350, each web page the user requests he is displayed for each web page or for each resource all available and pre-stored interlinks to target pages, as exemplarily illustrated in FIG. 8 the context of the link cloud 80.

Then, in a further step 362 the user decides to follow an available interlink and thus clicks a link in this link cloud which contains the desired link to the page, the user wanted to navigate. Of course, the proposed and displayed members of a link cloud may have names which describe the activity behind a respective link of a link cloud. So, for example according to FIG. 8 the name of a link named "hotel booking" is quite descriptive for the business activity behind that claim (i.e. to book a hotel room).

Thus, the skilled reader will appreciate that the probability is high that when the user clicks a recommended link, he will perfectly complete his desired business activity.

Then, after clicking a proposed link of a link cloud the server serves the desired target page in a step 364.

With reference to FIGS. 4 to 11 an exemplary use of the method is described, in the context of booking a flight, a hotel and some car and trains for doing a business trip. This context is for illustrative purposes to facilitate understanding of inventive concepts expressed herein and is not to be construed as a limitation of the underlying concepts expressed herein.

Figure 4:
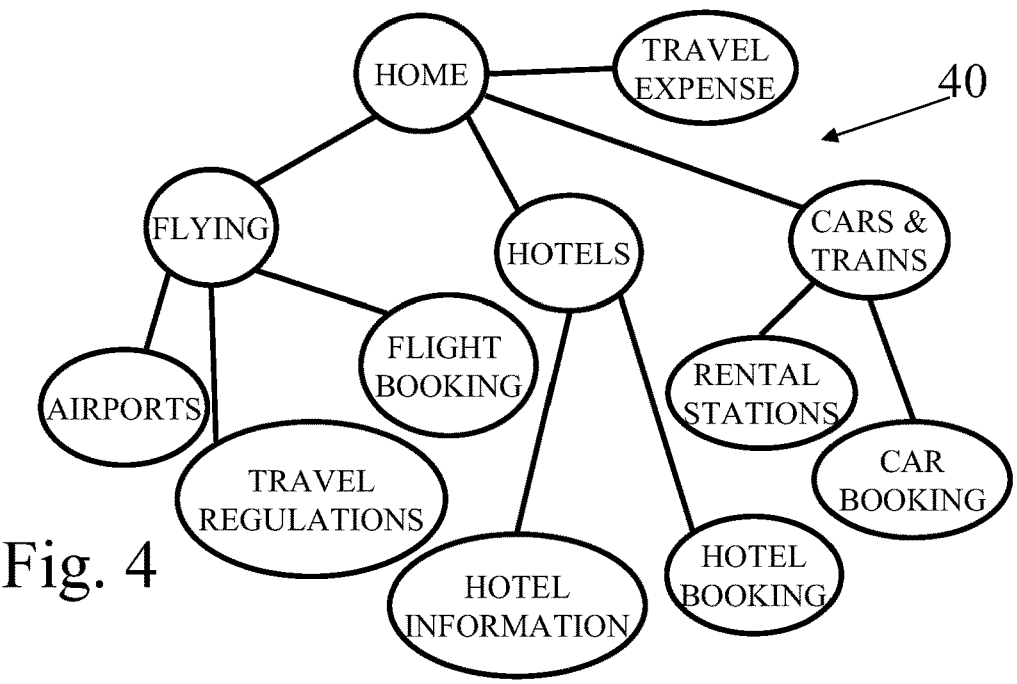
FIG. 4 showing a hierarchical arrangement of Internet-accessible resources, in accordance with a travel arrangement example.

FIG. 4 illustrates the structure of a sample system, showing a hierarchical arrangement of Internet-accessible resources which are usable when booking a flight, a hotel and some car and trains for doing a business trip. This example can be implemented using prior art techniques, which have numerous disadvantages, which will be described next below and set into contrast to the interlink technique.

Web-based systems are comprised of collections of resources in above sense. In many general web-based systems these resources are (web) pages, in Portal systems these are pages and portlets. These resources provide users with content and services. Different resources provide different content, which can still be related. For example, there might be pages part of an Enterprise Information Portal that provide means to book flights, hotels, cars or trains— different pages with similar use cases.

Prior to the Web 2.0 era these resources have been brought into relation by some central instances, usually administrators or content authors. However, those superimposed structures were not necessarily compliant to users' mental models and therefore resulted in significant effort to find the information needed. This became even worse, once user generated content was added, where the structure did not follow the design the administrator had in mind.

FIG. 4 shows the structure of a sample system within which four branches exist below the root node. Along the first branch authors have put everything having something to do with "flying", e.g. pages that provide information about airports (location, arrival and departure times of flights, etc.), travel regulations (official regulations and internal company regulations), and finally a page to book a flight. Along the second branch authors have put everything have something to do with "hotels" (e.g., pages that provide information about hotels at different locations as well as a page to finally book a hotel). Along the third branch authors have put similar pages having something to do with "cars and trains". Underneath the fourth branch users find pages to do their travel expense.

Experienced users know about their favorite airports, the external and internal travel regulations and so forth—they just want to do their bookings. Given the structure above users would have to perform a lot of (unnecessary) clicks to traverse the booking pages. With the availability of a tagging engine users could have had tagged (which would have been work, too) these pages with the term "booking", but even then users would have to fire up the tag cloud, select the right tag, analyze the result list of resources that have been tagged with the selected tag and select the right one out of those being presented. Moreover, there could be more pages tagged with the term "booking" but being irrelevant in the scenario described.

Figure 5:
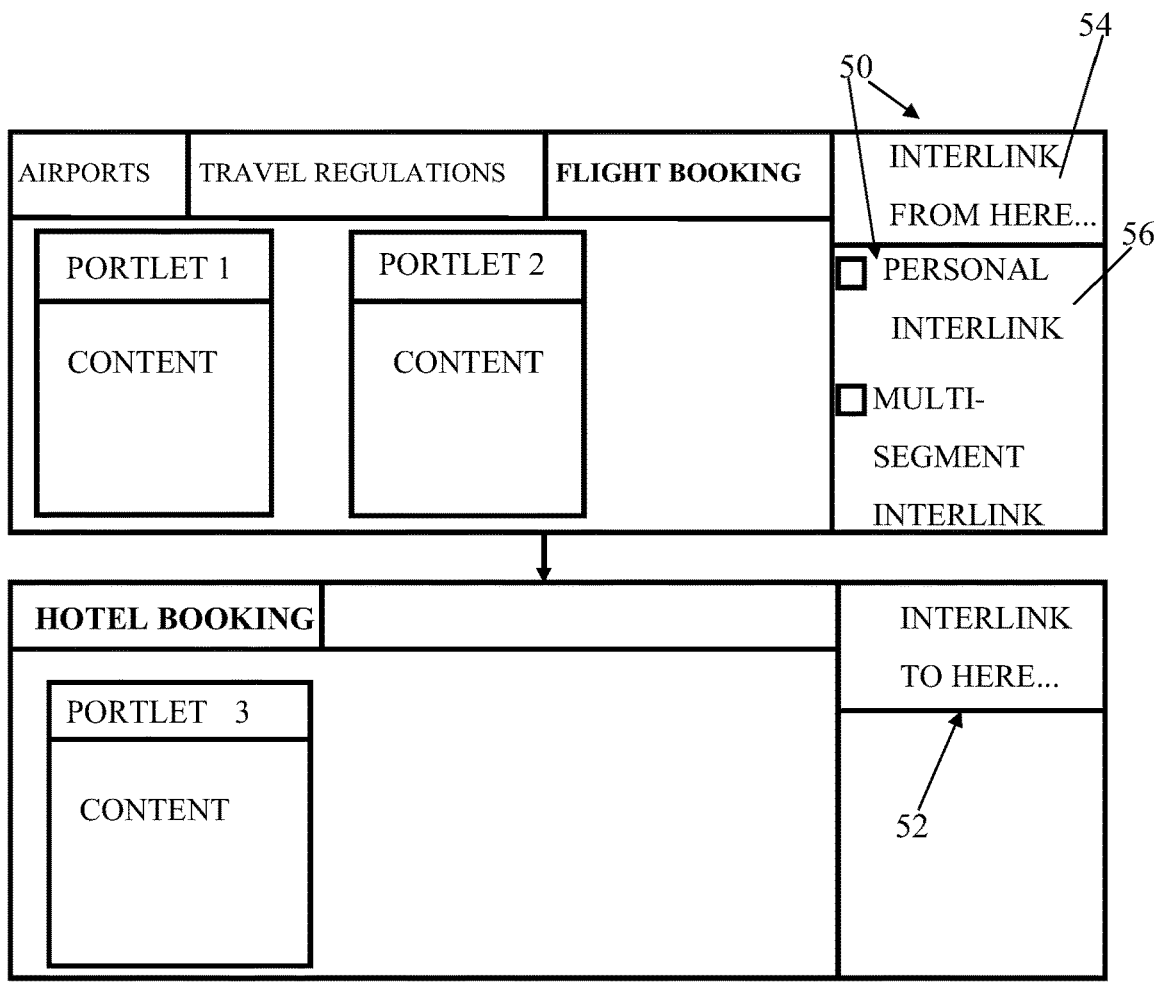
FIG. 5 illustrates an exemplary GUI implementing interlinks in accordance with an embodiment of the invention.
Figure 6:
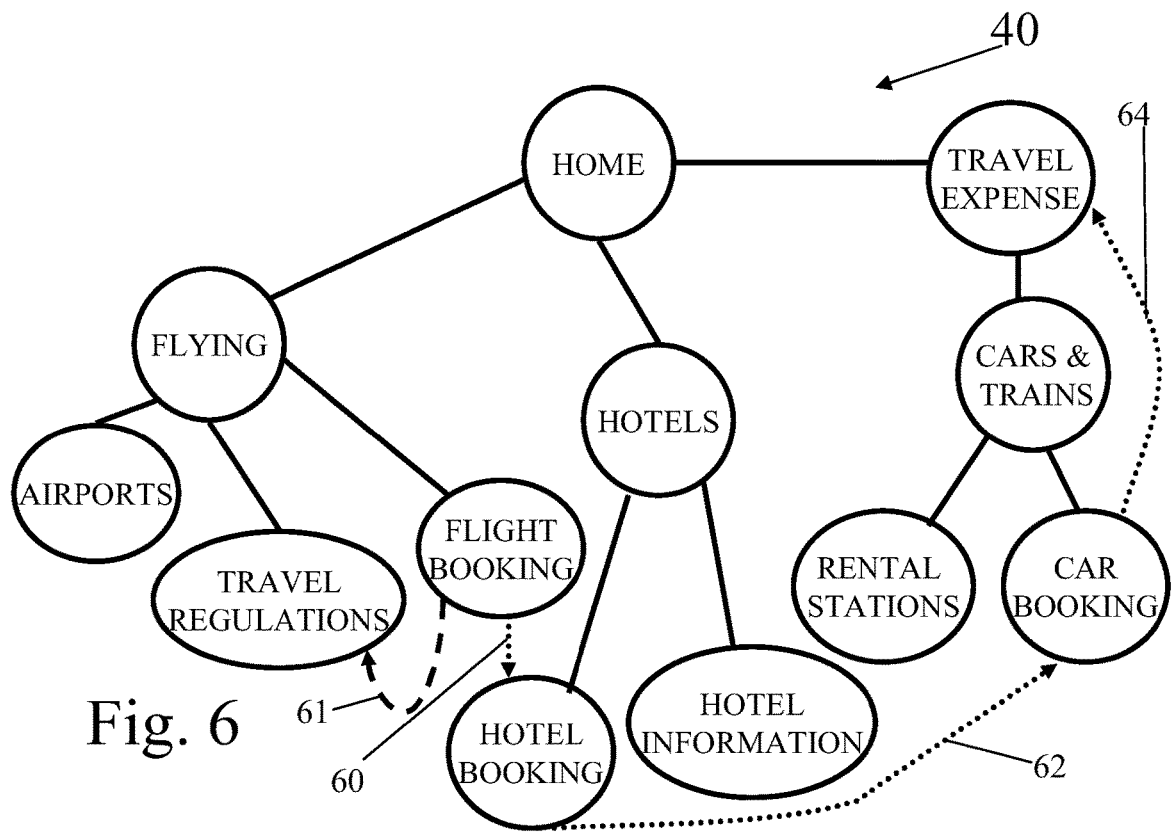
FIG. 6 shows a hierarchical arrangement of Internet-accessible resources including individual interlinks, in accordance with a travel arrangement example.

FIG. 5 illustrates an exemplary GUI 50, 52 displayed in the web client, when using an embodiment of the disclosure. FIG. 6 illustrates the structure of FIG. 3, but including individual interlinks 60, 62, 64 interconnecting between some of the shown resources, With reference to FIG. 5 and FIG. 6 secure individual interlinks according to this embodiment behave similar as individual tags as described in the following: Nauerz, A., et al., "New Tagging Paradigms for Content Recommendation in Web 2.0 Portals", Workshop on Adaptation and Personalization for Web 2.0, User Modeling, Adaptation and Personalization "UMAP", Trento, Italy, Jun. 22-26, 2009. This document is included in the filed Information Disclosure Statement (IDS) and is incorporated herein by reference.

The interlinks can only be seen by the user who created them. FIG. 5 exemplarily visualizes how secure individual interlinks can be created within a typical Web Portal solution. First, the user navigates to the resource where he wants to interlink from, the source resource. A resource can be a page, a portlet or anything uniquely reference-able. There he clicks a button which triggers the linking process. Next, he navigates to the resource he wants to interlink to, the target resource and clicks a button which finishes the linking process and establishes the interlink between both resources. This way every user can interlink the resources he thinks should be related, totally independent from what an administrator or content author had in mind who always try to create structures satisfying majorities but not necessarily single users. He can manually create shortcuts and cross-references between related content. This way navigating through the system can be individualized and speeded-up (optimized) in various ways.

In the example described earlier a user might be one of those experienced users that usually want to do his booking just by sequentially traversing the three booking pages and the travel expense page. Thus such user would create three individual interlinks as depicted in FIG. 6 (see the dotted connectors 60, 62, 64—one from the flight booking page to the hotel booking page, one from the hotel booking page to the car booking page, and one from the car booking page to the travel expense page). Next time he is doing his bookings he can follow this path by doing three clicks only, just following his individual interlinks including a widget collecting his travel expenses.

Figure 7:
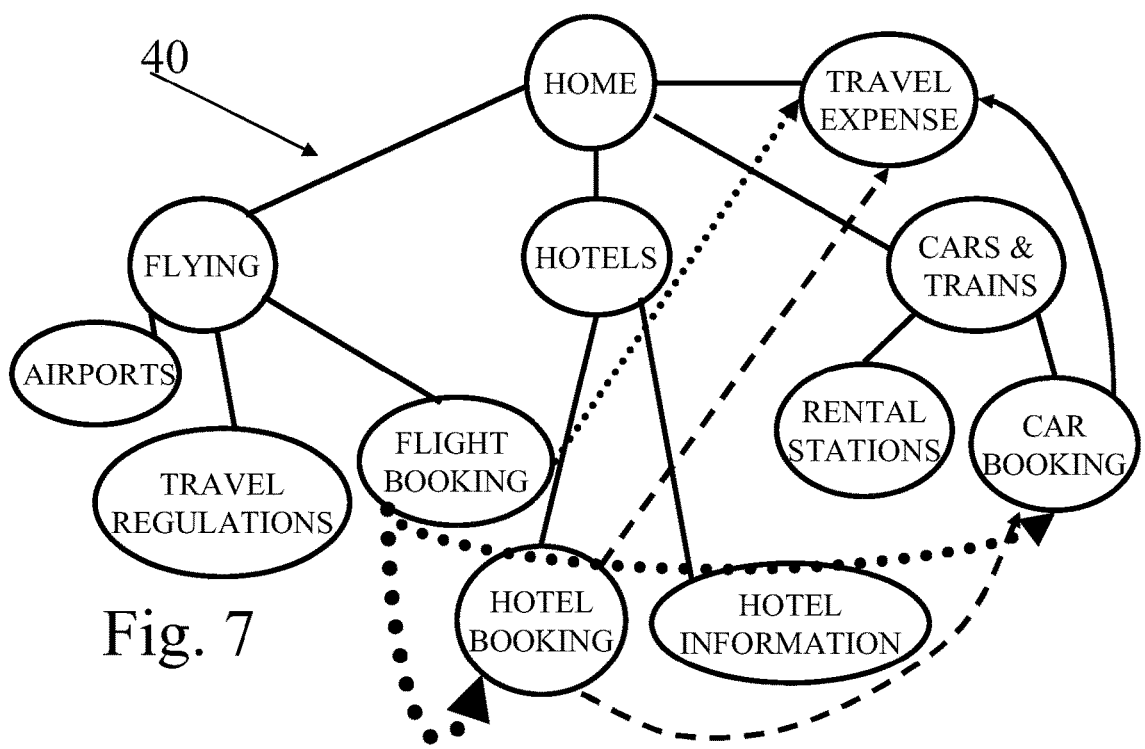
FIG. 7 shows a hierarchical arrangement of Internet-accessible resources including collaborative interlinks, in accordance with a travel arrangement example.

With reference to FIG. 7 the benefits of dynamic interlinking procedure becomes evident when allowing collaborative dynamic interlinking.

FIG. 7 illustrates the structure of FIG. 3, but includes collaborative interlinks interconnecting between some of the shown resources.

A collaborative dynamic interlink created by one user can be seen by all other users. Creating collaborative interlinks is done similar as creating secure interlinks, except that a checkbox indicating that the next interlink to be created should be a secure interlink has not to be selected (see above text to FIG. 5).

The individual interlinks created before may have been created as collaborative interlinks, too. Thus, one or more experienced users could have set interlinks between the booking pages. This can help people that want to do their booking for the very first time. These users do not need to search for one booking page after the other anymore, instead they can follow the interlinks available.

In one embodiment, individual and collaborative interlinks can be mixed. Additionally, an individual interlink can be converted to a collaborative interlink and vice-versa. For example, in addition to the collaborative interlinks (dotted connectors) interlinking the booking pages, less experienced users might want to interlink from these pages to the corresponding pages providing information for travel regulations (broken line connectors)—see FIG. 6 again.

With special reference to FIGS. 7 and 8 the feature of Visualizing Dynamic Interlinks according to the disclosure will be described next below.

FIG. 8 illustrates so called «Link Clouds» displayed at the web client for assisting him when finding the best suited resource he is looking for.

An important aspect is that of course multiple interlinks can be created from any resource to any other; similar, each single resource can be the endpoint of several interlinks pointing to it. Depending on user's needs the interlinks could also be added between other booking pages. For example, see FIG. 7, where solid as well as dotted lines represent collaborative interlinks (e.g., between the flight booking page and the car booking page, the flight booking page and the travel expense page and so forth). This could be done by users that do never need all three booking pages because they never book a car and want to skip the respective page.

This is analogous to what may be observed in collaborative tagging environments, where single resources can be tagged with multiple tags. The most important concept to visualize tags (and their importance) for single resources or a set of resources are tag clouds. Tag clouds display which tags are available and how often these have been applied (with respect to what one is looking at); more often applied tags are regarded as more important tags which are usually presented in a larger font size.

The skilled reader will appreciate that a similar mechanism is proposed, which we refer to as link clouds, for visualizing dynamic interlinks. When navigating from one resource to another, the user- or community created individual interlinks can be used in addition to the links that were originally created by an administrator or content author.

Therefore, if collaborative interlinks have been created as described above, when being on the flight booking page there could be a link to the superior flights page as modeled by the content author. But additionally a link cloud could display interlinks to the hotel page, the cars page and the travel expense page. If most users navigate from the hotel page to the cars page more people would interlink these two pages. So, if 10 users interlink the flight booking page to the hotel booking page, 5 from the flight booking page to the cars booking page and 1 from the flight booking page to the travel expense page, then the first linkage would be regarded the most important one, the second one the second most important one and so forth.

FIG. 7 visualizes this as the thicker solid connectors represent interlinks set by more users. Link clouds visualize this importance to the users. Different solutions can be thought of. In an embodiment according to FIG. 8 link clouds look like tag clouds presenting a description of the target resource they are linking to. Depending on the importance of the available collaborative interlinks (derived by how often a certain interlink has been set) some targets could be presented more prominent (larger font size) than others.

Figure 9:
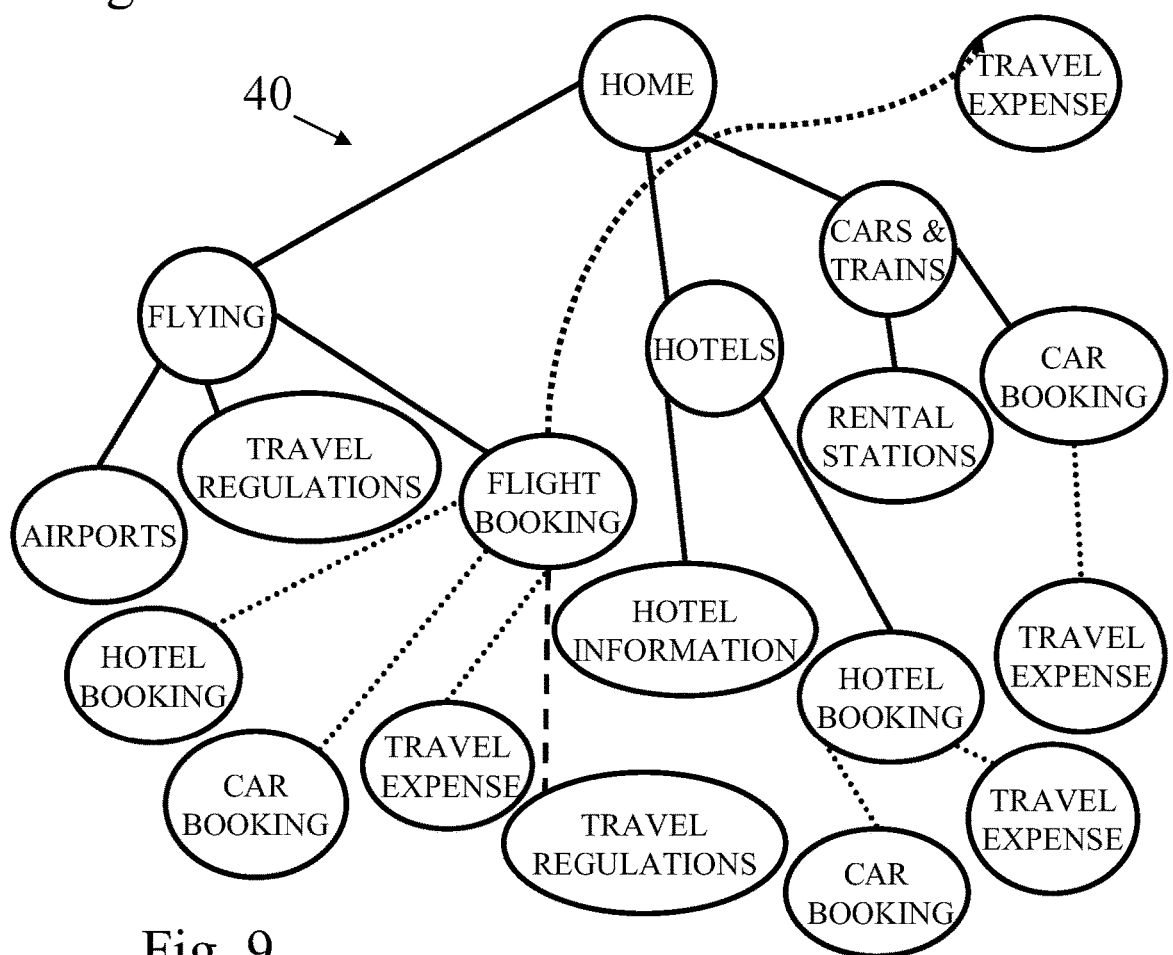
FIG. 9 illustrates individual and community navigation based on the scheme of FIG. 3, in accordance with an embodiment of the disclosure.
Figure 10:
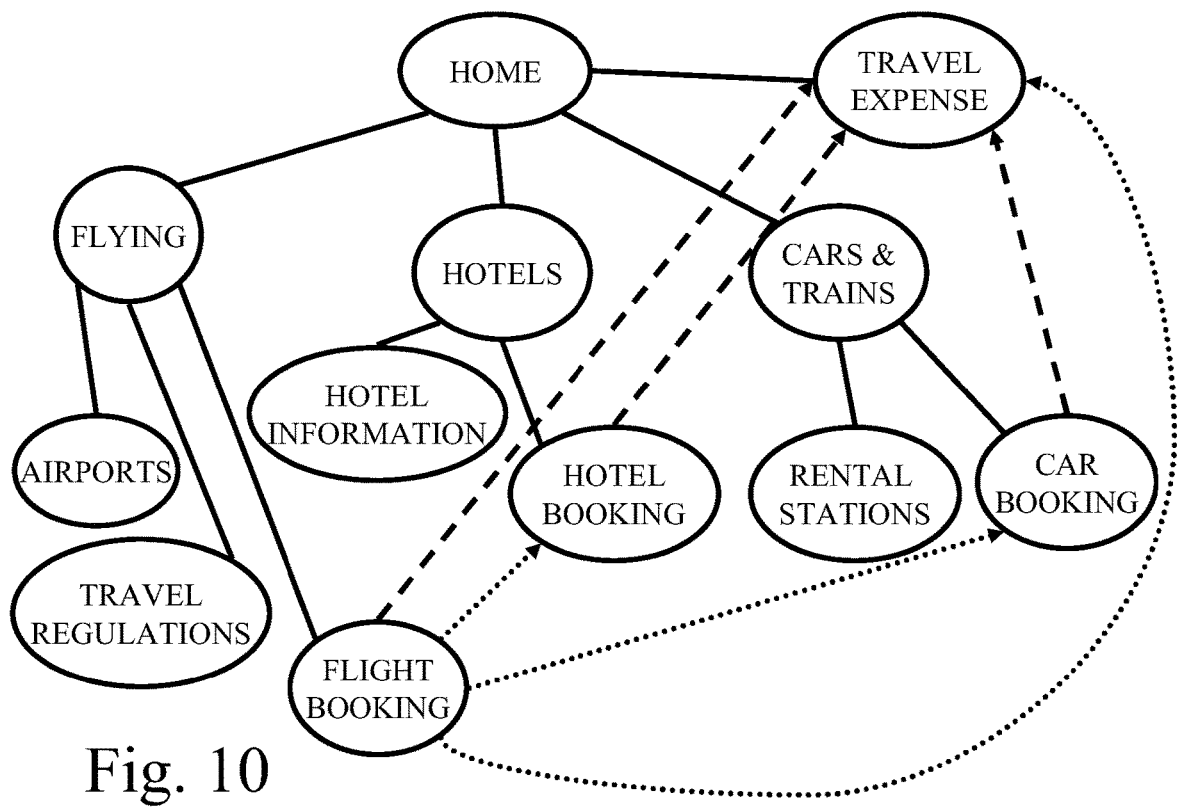
FIG. 10 illustrates inventional forward, backward and sideward linking of resources, in accordance with an embodiment of the disclosure.

With reference to FIGS. 9 and 10, individual and community navigation according to the disclosure will be described next. Specifically, FIG. 9 illustrates individual and community navigation based on the scheme of FIG. 6. FIG. 10 illustrates forward, backward and sideward linking of resources.

Taking into consideration all individual and collaborative interlinks available in the system according to the users are provided with additional navigation menus, accompanying the one originally created by an administrator or content author, from which they can select. Therefore users are provided with a pull-down menu, displayed at the top corner of every page, where a user can select between the following navigation menus: original navigation, individual navigation, community navigation, aggregated navigation.

The original navigation represents the navigation as created by an administrator or content author not containing any individual or community interlinks. The individual navigation adds individual interlinks to the original navigation so that these can be used from within the standard navigation menu. The community navigation adds collaborative interlinks to the original navigation. The aggregated navigation adds individual and collaborative interlinks to the original navigation.

It is also possible to display a navigation menu comprised of individual or community interlinks only, not containing the original navigation at all. This can be controlled via an additional check-box.

With respect to the previous sample, FIG. 9 shows the aggregated navigation, which contains all administrator created links, as well as all collaborative interlinks and the user's individual interlinks. The same figure without the broken line connector would represent the community navigation, without the dotted connectors the individual navigation and without the broken line and dotted connectors the original navigation.

With reference to FIG. 10, features of content recommendation according the present invention will be described in more detail. According to the invention, leveraging the knowledge about incoming and outgoing dynamic interlinks for any resource allows to perform related content recommendations. Three scenarios are proposed.

One of these scenarios, forward linking, (dotted lines in FIG. 10) describes the most simplistic case. With respect to the previous example one might know that interlinks exist pointing from the flight booking page to the hotel booking page, to the car booking page and to the travel expense page. Thus one knows that all these three target pages have something to do with the source page and can be recommended when being on the source page.

Backward linking (also dotted lines in FIG. 10) describes the second case. One might know that the flight booking page, the hotel booking page, and the car booking page link to the travel expense page. Thus one could recommend these three source pages when being on the target page.

Sideward linking (red lines in FIG. 7 again) describes the third case. Again, one might know that interlinks exist pointing from the flight booking page to the hotel booking page, car booking page and travel expense page. Thus, there might not only be a relationship between the source and target pages, but also among the sources (or targets) themselves. Thus, a user being on the hotel booking page might also be interested in the car booking page as both are referenced from the same source page. So, a respective link cloud is presented to him.

Figure 11:
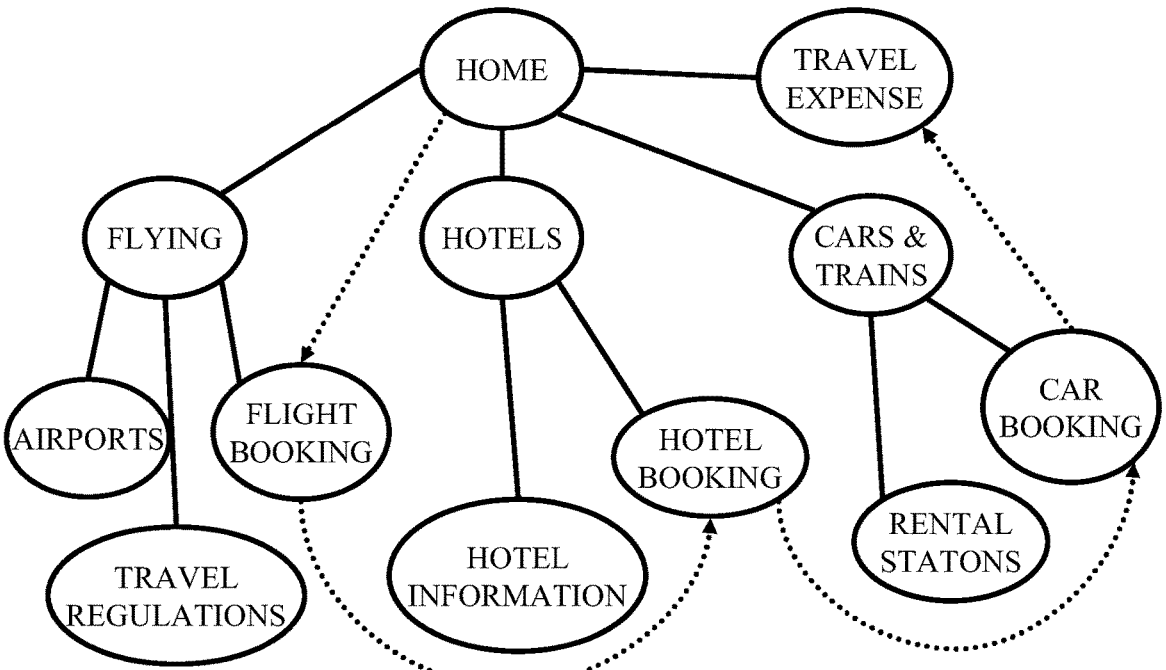
FIG. 11 illustrates the multi-segment linking of resources in accordance with an embodiment of the disclosure.

With reference to FIG. 11, features of multi-segment linking will be described next below.

The disclosure allows also for doing more than just interlinking one resource to exactly one other. Reference is given to a continuous sequence of interlinks (i.e., paths, as "link flows").

Such paths may be manually created by users (an additional check-box in the UI/GUI, see FIG. 5, allows to do so), or, in a more sophisticated variant those paths may be detected and recorded by the system. Latter could be based on following: From one resource to another, the "top" interlink (the one set by most users), or on analyzing which available interlinks users follow, again from one resource to another, most often.

With respect to our sample such a path could be comprised of the resources home page, flight booking page, hotel booking page, car booking page, and travel expense page—see FIG. 11.

With reference to FIG. 12 illustrating a dataset 129 usable for storing the information which is required or useful, respectively, when using an embodiment of the method for producing and displaying interlinks, such dataset comprises the following data:

the source object ID 122 (e.g. the URL of a source page or portlet);

the target object ID 124 (e.g., URL of the target page or portlet);

a flag 126 specifying if the link is to be handled as individual or collaborative. In case of a secure flag, the User ID 128 (e.g. in form of a traditional User ID when interlinking between objects of a single portal shall take place) otherwise the hardware ID of the computer a user had used, coupled with its URL.

date 130 and time 132 of generating the interlink.

Optionally comprised of this dataset is:

a subcommunity ID 134 (e.g. for experts, or learners or „medium experienced users);

an ID 136 of the hardware device in use for displaying the interlinks in an adequate way to the user;

a flag 138 specifying if the interlink has been generated during the weekend or not.

For the avoidance of doubt, the term "comprising", as used herein throughout the description and claims is not to be construed as meaning "consisting only of". It will be appreciated by those skilled in the art that the invention is not just limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, within and by a server system, of generating a first interlink having a source page, as a beginning of the first interlink, and a target page, comprising:
   receiving, from a first client and by the server system, a first request to begin the first interlink from the source page;
   storing, responsive to the first request to begin the first interlink and within a dataset, an identification of the source page as the beginning of the first interlink;
   receiving, from the first client and by the server system, a second request to complete the first interlink at the target page;
   storing, responsive to the second request to complete the first interlink and within the dataset, an identification of the target page;
   receiving a request for the source page;
   identifying, responsive to the request for the source page and from the dataset, the first interlink based upon the first interlink having the source page as the beginning; and
   serving, in response to the request for the source page, the source page, wherein
   the served source page is modified, using the first interlink, to include a link to the target page.

2. The method of claim 1, wherein
   the identifying identifies a plurality of interlinks based upon each of the plurality of interlinks respectively having the source page as a beginning, and
   the served source page is modified to include a plurality of links to a plurality of target pages respectively associated with each of the plurality of interlinks.

3. The method of claim 2, wherein
   the plurality of interlinks were generated from a plurality of different clients.

4. The method of claim 2, wherein
   weights are respectively assigned to each of the plurality of interlinks.

5. The method of claim 4, wherein
   the plurality of interlinks form a link cloud, and
   a display of the link cloud reflects the respective weights of each of the plurality of interlinks.

6. The method of claim 4, wherein
   the plurality of interlinks were generated from a plurality of different clients, and
   a weight for a particular interlink is based upon a number of clients generating the particular interlink.

7. The method of claim 1, wherein
   the source page is served with a graphical user interface (GUI) component, and
   the GUI component includes:
      a control for triggering beginning a generation of an interlink to be generated, and
      a control for triggering completing the generation of the interlink to be generated.

8. A server system for generating a first interlink having a source page, as a beginning of the first interlink, and a target page, comprising:
   a hardware processor configured to initiate:
      receiving, from a first client and by the server system, a first request to begin the first interlink from the source page;
      storing, responsive to the first request to begin the first interlink and within a dataset, an identification of the source page as the beginning of the first interlink;
      receiving, from the first client and by the server system, a second request to complete the first interlink at the target page;
      storing, responsive to the second request to complete the first interlink and within the dataset, an identification of the target page;
      receiving a request for the source page;
      identifying, responsive to the request for the source page and from the dataset, the first interlink based upon the first interlink having the source page as the beginning; and
      serving, in response to the request for the source page, the source page, wherein the served source page is modified, using the first interlink, to include a link to the target page.

9. The server system of claim 8, wherein
   the identifying identifies a plurality of interlinks based upon each of the plurality of interlinks respectively having the source page as a beginning, and
   the served source page is modified to include a plurality of links to a plurality of target pages respectively associated with each of the plurality of interlinks.

10. The server system of claim 9, wherein
    the plurality of interlinks were generated from a plurality of different clients.

11. The server system of claim 9, wherein
    weights are respectively assigned to each of the plurality of interlinks.

12. The server system of claim 11, wherein
    the plurality of interlinks form a link cloud, and a display of the link cloud reflects the respective weights of each of the plurality of interlinks.

13. The server system of claim 11, wherein
the plurality of interlinks were generated from a plurality of different clients, and
a weight for a particular interlink is based upon a number of clients generating the particular interlink.

14. The server system of claim 8, wherein
the source page is served with a graphical user interface (GUI) component, and
the GUI component includes:
  a control for triggering beginning a generation of an interlink to be generated, and
  a control for triggering completing the generation of the interlink to be generated.

15. A computer program product, comprising:
a hardware storage device having computer usable program code stored therein,
the computer usable program code, which when executed by a server system for generating a first interlink having
  a source page, as a beginning of the first interlink, and
  a target page, causes the server to perform:
  receiving, from a first client and by the server system, a first request to begin the first interlink from the source page;
  storing, responsive to the first request to begin the first interlink and within a dataset, an identification of the source page as the beginning of the first interlink;
  receiving, from the first client and by the server system, a second request to complete the first interlink at the target page;
  storing, responsive to the second request to complete the first interlink and within the dataset, an identification of the target page;
  receiving a request for the source page;
  identifying, responsive to the request for the source page and from the dataset, the first interlink based upon the first interlink having the source page as the beginning; and
  serving, in response to the request for the source page, the source page, wherein the served source page is modified, using the first interlink, to include a link to the target page.

16. The computer program product of claim 15, wherein
the identifying identifies a plurality of interlinks based upon each of the plurality of interlinks respectively having the source page as a beginning, and
the served source page is modified to include a plurality of links to a plurality of target pages respectively associated with each of the plurality of interlinks.

17. The computer program product of claim 16, wherein
the plurality of interlinks were generated from a plurality of different clients.

18. The computer program product of claim 17, wherein
weights are respectively assigned to each of the plurality of interlinks.

19. The computer program product of claim 18, wherein
the plurality of interlinks were generated from a plurality of different clients, and
a weight for a particular interlink is based upon a number of clients generating the particular interlink.

20. The computer program product of claim 15, wherein
the source page is served with a graphical user interface (GUI) component, and
the GUI component includes:
  a control for triggering beginning a generation of an interlink to be generated, and
  a control for triggering completing the generation of the interlink to be generated.

* * * * *